United States Patent
Popovich (12)

(10) Patent No.: US 6,301,027 B1
(45) Date of Patent: *Oct. 9, 2001

(54) HOLOGRAPHIC DESKTOP MONITOR

(75) Inventor: Milan M. Popovich, Leicester (GB)

(73) Assignee: DigiLens, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/482,742

(22) Filed: Jan. 13, 2000

Related U.S. Application Data

(63) Continuation of application No. 09/388,801, filed on Sep. 2, 1999, now Pat. No. 6,040,928.
(60) Provisional application No. 60/108,670, filed on Nov. 16, 1998.

(51) Int. Cl.$^7$ .................... G02B 5/32; G02F 1/13; G03B 21/00

(52) U.S. Cl. .................... 359/15; 359/4; 349/201; 348/343; 348/832; 353/70; 353/80

(58) Field of Search .................... 359/150, 16, 19, 359/4, 3; 349/6, 7, 201, 202; 348/40, 41, 343, 832; 353/31, 70, 80

(56) References Cited

U.S. PATENT DOCUMENTS

| | | | |
|---|---|---|---|
| 4,372,639 | 2/1983 | Johnson | 350/3.7 |
| 5,046,793 | 9/1991 | Hockley et al. | 359/12 |
| 5,200,844 * | 4/1993 | Suvada | 359/40 |
| 5,698,343 | 12/1997 | Sutherland et al. | 430/1 |
| 5,745,203 | 4/1998 | Valliath et al. | 349/113 |
| 5,796,499 | 8/1998 | Wenyon | 359/15 |
| 5,801,793 | 9/1998 | Faris et al. | 349/5 |
| 5,825,448 | 10/1998 | Bos et al. | 349/128 |
| 5,942,157 * | 8/1999 | Sutherland et al. | 353/582 |

FOREIGN PATENT DOCUMENTS

| | | | |
|---|---|---|---|
| 5-181401 * | 7/1993 | (JP) | 359/4 |
| WO 97/35223 | 9/1997 | (WO) | G02B/27/01 |
| WO 98/04650 | 2/1998 | (WO) | C09K/19/00 |

* cited by examiner

*Primary Examiner*—Jon Henry
(74) *Attorney, Agent, or Firm*—Law Offices of Terry McHugh

(57) ABSTRACT

A projection monitor and a method of displaying an output image on a viewing screen of the monitor utilize a number of reconfigurable holographic optical elements (HOEs), allowing the components of the monitor to be physically arranged in a compact configuration. The reconfigurable HOEs may be designed to perform simple optical functions that are commonly associated with traditional optical devices, such as those performed by lenses, prisms and mirrors. However, the reconfigurable HOEs are also designed to perform sophisticated optical manipulations, such as varying the light intensity with respect to a specific direction. Each reconfigurable HOE includes a hologram that is sandwiched between two electrode layers. The hologram is a holographic photopolymeric film that has been combined with liquid crystal. The hologram has an optical property that changes in response to an applied electrical field. Preferably, the compact configuration of the monitor's components minimizes the required depth of the monitor, making the monitor ideally suited for desktop use. In a first embodiment, the monitor includes a mirror that reflects images projected from an image generator to a holographic reflector having reconfigurable HOEs. The holographic reflector operates to reflect and diffract the projected images to a viewing screen also having reconfigurable HOEs. The reconfigurable HOEs of the screen operate to diffuse the projected images in a predefined diffusion pattern. In a second embodiment, the image generator is positioned to project images directly to the holographic reflector, thereby eliminating the need for the mirror.

19 Claims, 5 Drawing Sheets

HOLOGRAPHIC DESKTOP MONITOR

CROSS REFERENCE TO RELATED APPLICATION

This patent application is a continuation of application Ser. No. 09/388,801, filed Sep. 2, 1999, now U.S. Pat. No. 6,040,928 which is a non provisional application of provisional application No. 60/108,670, filed Nov. 16, 1998.

TECHNICAL FIELD

The invention relates generally to projection systems and more particularly to a projection system having holographic optical elements.

DESCRIPTION OF THE RELATED ART

Projection systems operate to display an image or a sequence of images by projecting the image(s) onto a screen. These systems tend to be designed for multiple viewers and usually require the projection screen to have a large viewing area in order to achieve large fields of view at comfortable viewing distances. The projected images vary in size, depending on the particular projection system. For example, projection systems that are used in theaters are able to display projected images that are extremely large, while projection systems that are used in offices for presentations are typically limited to much smaller projected images.

With reference to FIG. 1, an exemplary prior art projection system 10 is shown. The projection system 10 includes a projector 12 and a projection screen 14. The projector and the screen operate to display a color image formed by projecting three monochromatic image components of the color image onto the screen. The projector 12 is comprised of an image generator 16 and projection optics 18. The image generator 16 contains a light source 20 that provides white illumination light to an input image display panel 22. The display panel would typically be based on reflective LDC or MEMs display technology. The display panel generates the image components that are to be projected onto the screen.

The image generator 16 also includes a color filter 24 that is positioned between the light source 20 and the display panel 22. The color filter 24 operates to pass only a selected portion of the illumination light, with the selected portion having a particular peak wavelength. The color filter is designed to sequentially transmit tristimulus color lights, i.e., red, blue and green lights. Typically, the color filter is a rotating disc having three transparent regions. These regions contain pigments to filter the illumination light based on wavelength. The rotation of the disc allows alternating colors to be sequentially transmitted through the disc. When light of a particular peak wavelength impinges upon the display panel 22, an input image component corresponding to that particular peak wavelength is displayed on the display panel 22. The image component is then projected toward the projection screen 14 through the projection optics 18. This process is repeated for the other two colors. The sequential projection of the input image components that correspond to the tristimulus color lights allows the displayed image on the projection screen to appear to be in color, due to fusion of the three image components within the eye integration time. The size of the displayed image on the projection screen is primarily determined by the projection optics 18 and the distance between the projection optics and the projection screen.

The projection optics 18 includes one or more zooming lenses (not shown) to magnify the projected image components from the image generator 16. These zooming lenses are selectively repositioned within the projection optics to provide specific magnification powers. The projection optics may also include one or more focusing lenses (not shown) to focus the projected image on the screen 14. The projection screen may be configured for "reflective viewing," i.e., viewing from the side of the projection screen facing the projector 12, or for "transmissive viewing," i.e., viewing from the side of the projection screen opposite to the projector.

A concern with conventional projection systems, such as the projection system 10, is that a large housing is required to incorporate the components of a complete projection system into an integrated device. This is partly due to the fact that the image generator and the projection screen need to be separated by a significant distance, increasing the minimum depth of the housing.

Therefore, what is need is an efficient projection system having a compact optical configuration that can display color images of high quality.

SUMMARY OF THE INVENTION

A projection monitor and a method of displaying an output image on a viewing screen of the monitor utilize a number of reconfigurable holographic optical elements (HOEs), allowing the components of the monitor to be physically arranged in a compact configuration. The reconfigurable HOEs may be designed to perform simple optical functions that are commonly associated with traditional optical devices, such as those performed by lenses, prisms and mirrors. However, the reconfigurable HOEs are also designed to perform sophisticated optical manipulations, such as varying the light intensity with respect to a specific direction and/or generating virtual (holographic) images. Preferably, the compact configuration of the monitor's components minimizes the required depth of the monitor, making the monitor ideally suited for desktop use.

Each reconfigurable HOE of the monitor includes a hologram that is sandwiched between two electrode layers. The hologram is a holographic photopolymeric film that has been combined with liquid crystal. The presence of the liquid crystal allows the hologram to exhibit optical characteristics that are dependent on an applied electrical field. Preferably, the hologram is a Bragg-type hologram, having a high diffraction efficiency. The electrode layers may be made of Indium Tin Oxide (ITO), which typically has a transmission efficiency of greater than 80%.

The reconfigurable HOE has at least two optical operating states, a diffractive state and a passive state. The diffractive properties of the reconfigurable HOE primarily depend on the recorded holographic fringes in the photopolymeric film. In the diffractive state, the reconfigurable HOE diffracts propagating light in a predefined manner. In the passive state, the reconfigurable HOE does not optically alter the propagating light. Initially, the hologram of the reconfigurable HOE is in the diffractive state, such that received light is diffracted in the predefined manner. However, when an electrical field is generated in the hologram by applying voltage to the electrode layers of the reconfigurable HOE, the operating state of the hologram switches from the diffractive state to the passive state.

In a first embodiment of the invention, the projection monitor includes an image generator, a mirror, a holographic reflector and a viewing screen that are collectively contained within a housing. The projection monitor further includes two conventional optical devices whose main function is to assist in the image transfer but which are not of key significance to the understanding of the invention. Preferably, the depth of the housing is approximately half the height of the viewing screen. The image generator of the monitor is configured to sequentially generate and project three monochromatic image components for each color image to be displayed on the viewing screen. The composite color image is formed on the viewing screen by sequentially displaying the three projected monochromatic images that correspond to the tristimulus colors, i.e., red, blue and green. With a sufficiently fast display rate, the sequentially displayed monochromatic images form a single image that will appear to be in color, due to fusion of the three image components within the eye integration time.

The mirror and the holographic reflector operate to direct the projected image components from the image generator to the viewing screen. The mirror is positioned in the line of sight of the image generator and is positioned to reflect the image components to the holographic reflector. The holographic reflector is positioned to receive the image components from the mirror and to reflect the image components to the viewing screen. The optical devices of the monitor are situated in the path of the propagating image components to correct off-axis aberrations that are caused by the physical arrangement of the monitor's components. The first optical device is situated between the image generator and the mirror, while the second optical device is located between the mirror and the holographic reflector.

The holographic reflector includes three reconfigurable HOEs that are holographically configured to reflect and diffract the projected monochromatic image components toward the viewing screen. Each reconfigurable HOE of the holographic reflector is also configured to optically manipulate only the monochromatic image component of a single tristimulus color when in the diffractive state. In a switching cycle that is both chromatically and temporally synchronized with the sequenced projection of the monochromatic images by the image generator, the reconfigurable HOEs of the holographic reflector are electrically manipulated to establish a rotation in which one color-specific reconfigurable HOE is set to the diffractive state, while the other color-specific reconfigurable HOEs are set to the passive state. Thus, at any given time, only one of the reconfigurable HOEs of the holographic reflector is enabled to the diffractive state to manipulate its monochromatic image component.

The viewing screen also includes three reconfigurable HOEs. Similar to the three reconfigurable HOEs of the holographic reflector, each reconfigurable HOE of the screen is holographically designed to optically manipulate the projected monochromatic image component of a particular tristimulus color. However, the three reconfigurable HOEs of the screen are holographically configured to diffuse the projected monochromatic image components in a predefined diffusion pattern by angularly varying the light intensity of the image components that are transmitted through the viewing screen. The predefined diffusion pattern allows the viewing screen to display a uniformly bright color image formed by the diffused monochromatic image components, even at large viewing angles. In operation, the reconfigurable HOEs of the screen are selectively enabled to one of the optical states in the same manner as the reconfigurable HOEs of the holographic reflector. That is, the switching cycle of the reconfigurable HOEs of the viewing screen is identical to the switching cycle of the reconfigurable HOEs of the holographic reflector in order to sequentially diffuse each different monochromatic image component projected by the image generator.

In a second embodiment of the invention, the image generator of the monitor is positioned relative to the holographic reflector to project the image components directly to the holographic reflector, thereby eliminating the need to utilize the mirror in order to reflect the projected image components from the image generator to the holographic reflector. In this embodiment, the monitor includes only a single optical device. The single optical device is positioned between the image generator and the holographic reflector. Similar to the two optical devices of the first embodiment, the single optical device operates to correct off-axis aberrations. Note that the aberrations are corrected by optimizing all components in the projection monitor. The holographic reflector would play an important role in this optimization process. Depending on the orientation of the holographic reflector with respect to the viewing screen, the reconfigurable HOEs of the holographic reflector and the viewing screen in the second embodiment may be holographically configured differently than the reconfigurable HOEs in the first embodiment. However, the operations of the holographic reflector and the viewing screen are identical for both embodiments.

In addition to displaying color images, the projection monitor in accordance with both embodiments can operate in a see-through mode. In the see-through mode, the reconfigurable HOEs of the holographic reflector and the viewing screen are all set to the passive state. This feature allows a viewer to see an image displayed on a separate display system positioned behind the projection monitor through the holographic reflector and the viewing screen of the monitor. With the reconfigurable HOEs of the holographic reflector and the viewing screen set to the passive state, the projection monitor could also be used simply as a window. This may be advantageous in applications where visibility of surroundings is important, for example, in vehicle and aircraft applications.

DETAILED DESCRIPTION

Figure 1:
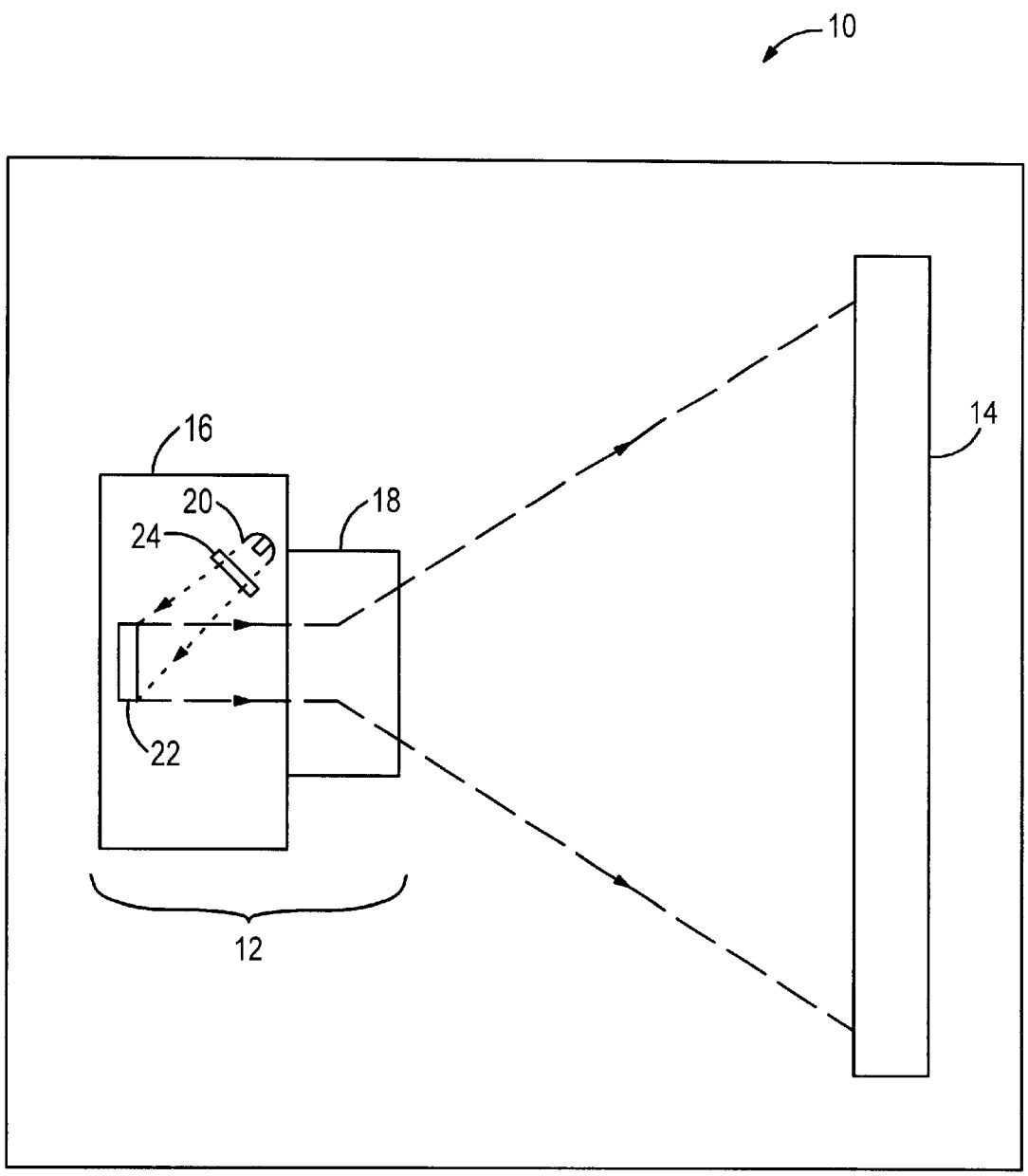
FIG. 1 is a schematic diagram of an exemplary prior art projection system.
Figure 2:
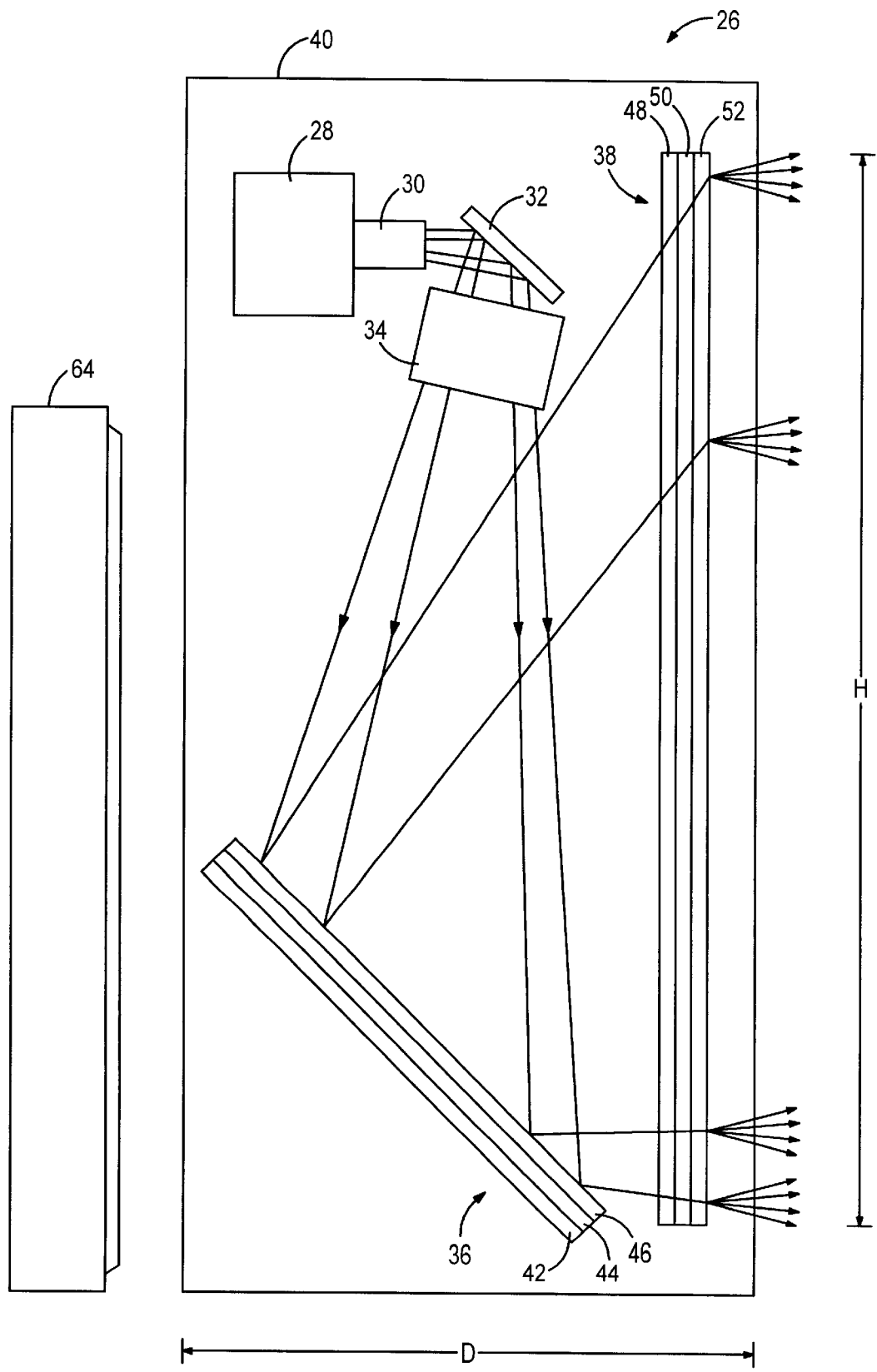
FIG. 2 is a schematic diagram of a compact projection monitor in accordance with a first embodiment of the present invention.

With reference to FIG. 2, a compact projection monitor 26 in accordance with a first embodiment of the invention is shown. The projection monitor includes an image generator 28, a first optical device 30, a mirror 32, a second optical device 34, a holographic reflector 36 and a viewing screen 38 that are collectively contained within a housing 40. The optical configuration and the physical arrangement of the components within the housing allow the monitor to have a more compact size than conventional projection systems, such as the prior art projection system 10 of FIG. 1. Preferably, the monitor is sufficiently compact, so as to be utilized as a display system that can be placed on an ordinary office desk. In the preferred embodiment, the depth D of the monitor is approximately half the height H of the viewing screen.

The compactness of the projection monitor 26 is primarily due to the utilization of what will be referred to as "reconfigurable holographic optical elements" (HOEs) in the holographic reflector 36 and the viewing screen 38. Similar to conventional HOEs, these reconfigurable HOEs can perform functions typically associated with traditional optical elements, such as prisms, lenses and mirrors, as well as more sophisticated optical manipulations. However, the reconfigurable HOEs can alter their optical properties when an electrical field is applied.

The reconfigurable HOE includes a hologram that is sandwiched between two electrode layers. The hologram is preferably a Bragg-type hologram, having a high diffraction efficiency. The hologram is a holographic photopolymeric film that has been combined with liquid crystal. As an example, the photopolymeric film may be composed of a polymerizable monomer having dipentaerythritol hydroxypentacrylate, as described in PCT Application No. PCT/US97/12577 by Sutherland et al. The liquid crystal can be suffused into the pores of the photopolymeric film. The holographic fringes may be recorded into the photopolymeric film either prior to or after being combined with the liquid crystal. In the preferred embodiment, the photopolymeric material is combined with the liquid crystal prior to a recording. In this preferred embodiment, the liquid crystal and the polymer material are pre-mixed and the phase separation takes place during the recording of the hologram, such that the holographic fringes become populated with a high concentration of liquid crystal droplets. This process can be regarded as a "dry" process, which is advantageous in terms of mass production of the reconfigurable HOEs.

Recording of the hologram can be accomplished by a traditional optical process in which interference fringes are created by applying beams of light. Alternatively, the interference fringes may be artificially created by using highly accurate laser writing devices or other optical replication techniques. The electrode layers that are adjacent to the hologram are made of a transparent conductive material. As an example, the electrode layers may be made of Indium Tin Oxide (ITO), which usually has a transmission efficiency of greater than 80%. An electrical field is generated within the hologram when a potential difference is applied to the layers.

The reconfigurable HOE has at least two optically operating states, a diffractive state and a passive state. The optical properties of the reconfigurable HOE primarily depend on the recorded holographic fringes in the photopolymeric film. In the diffractive state, the reconfigurable HOE diffracts propagating light in a predefined manner. In the passive state, the reconfigurable HOE does not optically alter the propagating light. Initially, the hologram of the reconfigurable HOE is in the diffractive state, such that received light is diffracted in the predefined manner. However, when an electrical field is created in the hologram by applying voltage to the electrode layers of the reconfigurable HOE, the optical state of the hologram switches from the diffractive state to the passive state.

The image generator 28 of the monitor 26 may be a conventional image generator, such as the image generator 16 of the prior art system 10. Although not shown in FIG. 2, the image generator 28 preferably utilizes a reflective miniature silicon backplane device, such as an SVGA device manufactured by Colorado MicroDisplays, as a display panel. The image generator operates to sequentially generate and project color sets of monochromatic image components. A single color set includes three monochromatic image components that correspond to the tristimulus color, i.e., red, green and blue. These image components are optically manipulated by optical devices 30 and 34 and the mirror 32 toward the holographic reflector 36. The optical devices provide the optical interface between the image generator and the reconfigurable HOEs of the holographic reflector, while the mirror provides the necessary reflecting of the input images in order for the image components to be properly projected toward the holographic reflector. The optical devices 30 and 34 may include a combination of off-axis aspheric, cylindrical and prismatic optical elements to correct off-axis aberrations that are caused by the arrangement of the monitor's components. The optical devices may be designed to be anamorphic to compensate for image format distortions.

The holographic reflector 36 includes three reconfigurable HOEs 42, 44 and 46. The three reconfigurable HOEs are holographically designed to reflect the image components received from the optical device 34 toward the screen 38 and also to diffract the image components, so that the image components have been spatially compensated for geometric distortions when displayed on the screen. Furthermore, each of the reconfigurable HOEs is holographically configured to optically manipulate only the image components of a particular tristimulus color. The reconfigurable HOEs operate in a chromatic synchronization with the sequenced projection of the image components to selectively manipulate the image components to the viewing screen 38.

The viewing screen 38 also includes three reconfigurable HOEs 48, 50 and 52. Similar to the reconfigurable HOEs of the holographic reflector, the reconfigurable HOEs 48–52 are each configured to optically manipulate the image components of a particular tristimulus color. However, the reconfigurable HOEs 48–52 are also holographically designed to diffuse the image components in a wide diffusion pattern, so that the viewing screen displays a uniformly bright color image formed by the diffused image components, even at large viewing angles. The wide diffusion pattern is produced by angularly varying the light intensity of the image components that are transmitted through the reconfigurable HOEs of the viewing screen.

Figure 3:
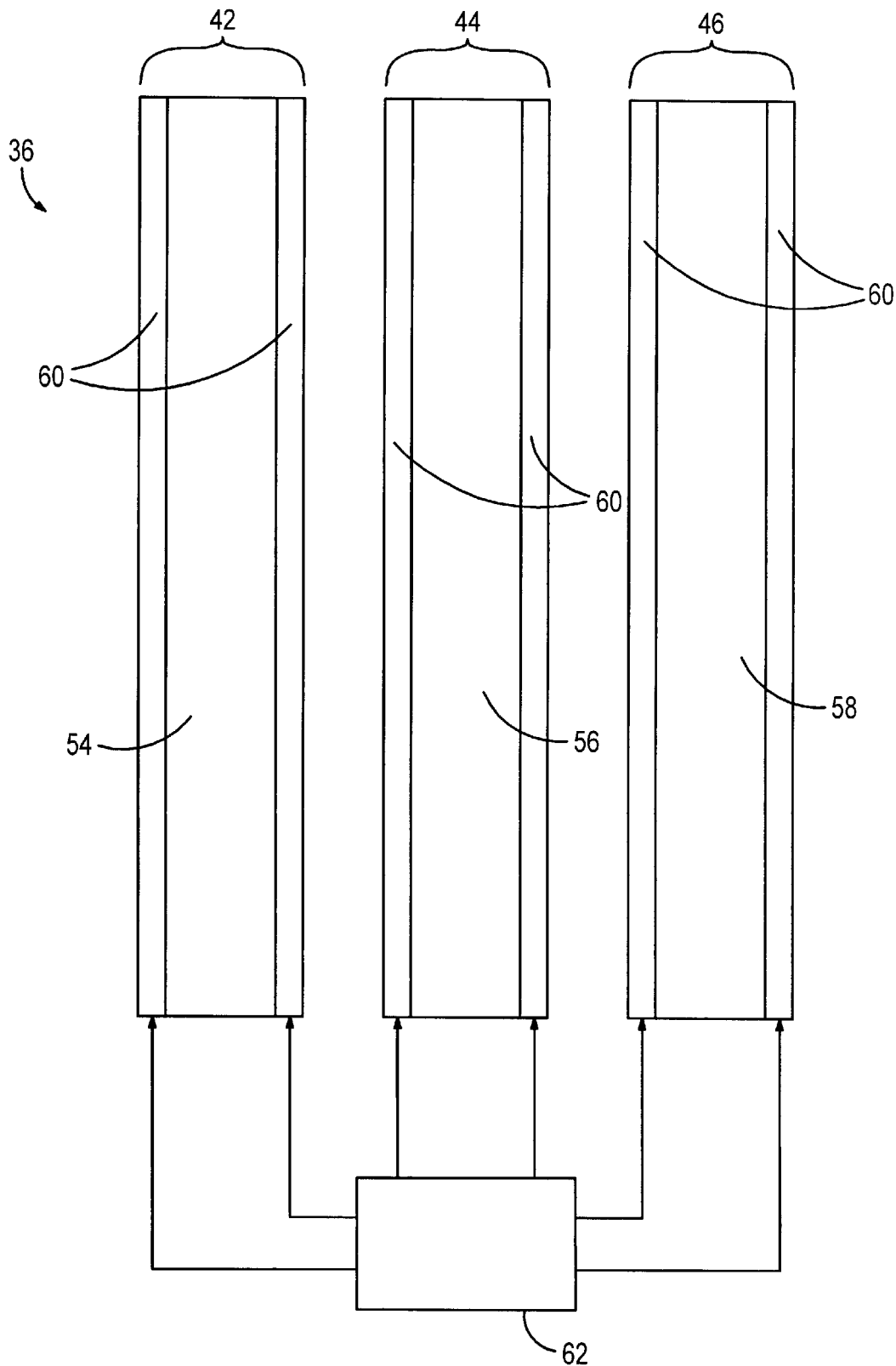
FIG. 3 is a schematic diagram of the components of a holographic reflector included in the compact projection monitor of FIG. 2.

Structurally, the holographic reflector 36 and the viewing screen 38 are essentially identical, except for the interference fringes recorded in the reconfigurable HOEs 42–46 and 48–52. Therefore, only the holographic reflector will be described in detail. In FIG. 3, the components of the reconfigurable HOEs 42–46 of the holographic reflector are shown. Each reconfigurable HOE 42–46 includes a hologram 54, 56 or 58 that is positioned between two electrodes 60. The reconfigurable HOE 42 includes the hologram 54 that is sandwiched between two electrodes 60. Similarly, the reconfigurable HOE 44 includes the hologram 56 between a pair of electrodes 60, and the reconfigurable HOE 46 includes the hologram 58 between another pair of electrodes 60. Each hologram is holographically configured to have a diffractive characteristic that directs projected image components to the viewing screen 38. However, each hologram is also configured such that only a particular monochromatic light is diffracted by the hologram. Consequently, each of the holograms diffracts only the projected image component that corresponds to a particular color. The hologram 54 is dedicated to operate on the red image component. The hologram 56 is configured to only operate on the green image component, while the hologram 58 is specific to the blue image component.

The electrodes 60 of the reconfigurable HOEs 42–46 are individually coupled to a voltage controller 62. The voltage controller selectively provides an excitation signal to the electrodes of a selected reconfigurable HOE, switching the hologram of that reconfigurable HOE from the diffractive state to the passive state. The hologram in the passive state can then be switched to the diffractive state by removing the voltage to the electrodes.

Although not illustrated, the reconfigurable HOEs 48–52 of the viewing screen 38 also include holograms that are positioned between two electrodes. The reconfigurable HOEs of the viewing screen may be coupled to the voltage controller 62, along with the reconfigurable HOEs 42–46 of the holographic reflector 36. In an alternative arrangement, the reconfigurable HOEs of the viewing screen may be coupled to a separate voltage controller. The only significant difference between the reconfigurable HOEs 42–46 and the reconfigurable HOEs 48–52 is that the reconfigurable HOEs 42–46 are holographically configured to reflect and diffract the projected image components, while the reconfigurable HOEs 48–52 are configured to diffuse the projected image components.

The reconfigurable HOEs 42–46 of the holographic reflector 36 and the reconfigurable HOEs 48–52 of the viewing screen 38 allow the monitor 26 to operate in either a display mode or a "see-through" mode. In the display mode, the monitor actively operates to display color images on the viewing screen. In the see-through mode, the monitor ceases the display operation and becomes transparent, allowing a viewer to see an external display device 64 that is positioned behind the monitor through the viewing screen and the holographic reflector 36 of the monitor. The external display device may be a conventional computer monitor. Consequently, the back surface of the housing 40 facing the external display device is optically transparent to facilitate the see-through mode of the monitor. An outer liquid crystal (LC) shutter (not shown) may be incorporated onto the back surface of the housing to shut out external ambient light, while the monitor is in the display mode.

During the display mode, the monitor 26 operates to display a color image by sequentially projecting three monochromatic image components to the viewing screen 38, with each monochromatic image component corresponding to one of the tristimulus colors. The monochromatic image components are sequentially generated and projected toward the mirror 32 by the image generator 28. The projected image components are then reflected by the mirror and redirected toward the holographic reflector 36. While propagating from the image generator to the holographic reflector, the projected image components are transmitted through the optical devices 30 and 34 that operate to correct off-axis aberrations. After traveling through the optical device 34, the image components are reflected by the holographic reflector toward the viewing screen. In addition, the holographic reflector optimally diffracts the images to minimize color dispersion. The diffractive characteristic of the holographic reflector is primarily due to the recorded interference fringes in the holograms of the reconfigurable HOEs 42–46.

The reconfigurable HOEs 42–46 of the holographic reflector 36 operate sequentially to optically manipulate the projected monochromatic image components. In a cycle synchronized with the refresh rate of the image generator 28, the reconfigurable HOEs of the holographic reflector are selectively and individually set to the diffractive state by the voltage controller 62. During a period when the image generator 28 projects a red image component, the reconfigurable HOE 42 is set to the diffractive state to reflect and diffract the red image component toward the viewing screen 38. The other reconfigurable HOEs 44 and 46 of the holographic reflector are set to the passive state. During a period when the image generator projects a green image component, the reconfigurable HOE 44 is set to the diffractive state to reflect and diffract the green image component toward the viewing screen, while the reconfigurable HOEs 42 and 46 are set to the passive state. Similarly, during a period when the image generator projects a blue image component, the reconfigurable HOE 46 is set to the diffractive state to reflect and diffract the blue image component toward the viewing screen, while the reconfigurable HOEs 42 and 44 are set to the passive state. The order in which the monochromatic image components are projected by the image generator and then reflected and diffracted by the reconfigurable HOEs of the holographic reflector is not critical to the invention.

The diffracted image components from the holographic reflector 36 are then sequentially diffused by the viewing screen 38. The viewing screen 38 operates in a similar manner as the holographic reflector. The reconfigurable HOEs 48–52 of the viewing screen diffuse the projected monochromatic images in a sequential fashion, similar to the reconfigurable HOEs 42–46 of the holographic reflector. During the period when the image generator 28 projects the red image component and the reconfigurable HOE 42 of the holographic reflector is set to the diffractive state, the reconfigurable HOE 48 of the screen is also set to the diffractive state to diffuse the red image component in the predetermined diffusion pattern. The other reconfigurable HOEs 50 and 52 of the screen are set to the passive state. During the period when the image generator projects the green image component and the reconfigurable HOE 44 of the holographic reflector is set to the diffractive state, the reconfigurable HOE 50 of the screen is also set to the diffractive state to diffuse the green image component in the predetermined diffusion pattern, while the reconfigurable HOEs 48 and 52 are set to the passive state. Similarly, during the period when the image generator projects the blue image component and the reconfigurable HOE 46 of the holographic reflector is set the diffractive state, the reconfigurable HOE 52 of the screen is set to the diffractive state to diffuse the blue image component in the predetermined diffusion pattern, while the reconfigurable HOEs 48 and 50 are set to the passive state. With a sufficient refresh rate of the image generator and a corresponding switching rate of the reconfigurable HOEs 42–46 and 48–52, the sequentially diffused monochromatic image components form a single image that will appear to be in color, due to fusion of the three image components within the eye integration time. Since a single hologram of the reconfigurable HOEs 42–52 operates on a particular monochromatic image, the issue of color aberration due to wavelength variations is virtually eliminated.

During the see-through mode, the monitor 26 operates to become optically transparent, so that the external display device 64 can be seen through the monitor. In this mode, the reconfigurable HOEs 42–46 of the holographic reflector 36 and the reconfigurable HOEs 48–52 of the viewing screen 38 are all set to the passive state. The passive state of the reconfigurable HOEs 42–52 allows a viewer to observe an image displayed on the external display device through the viewing screen 38 and the holographic reflector 36 of the monitor.

Figure 4:
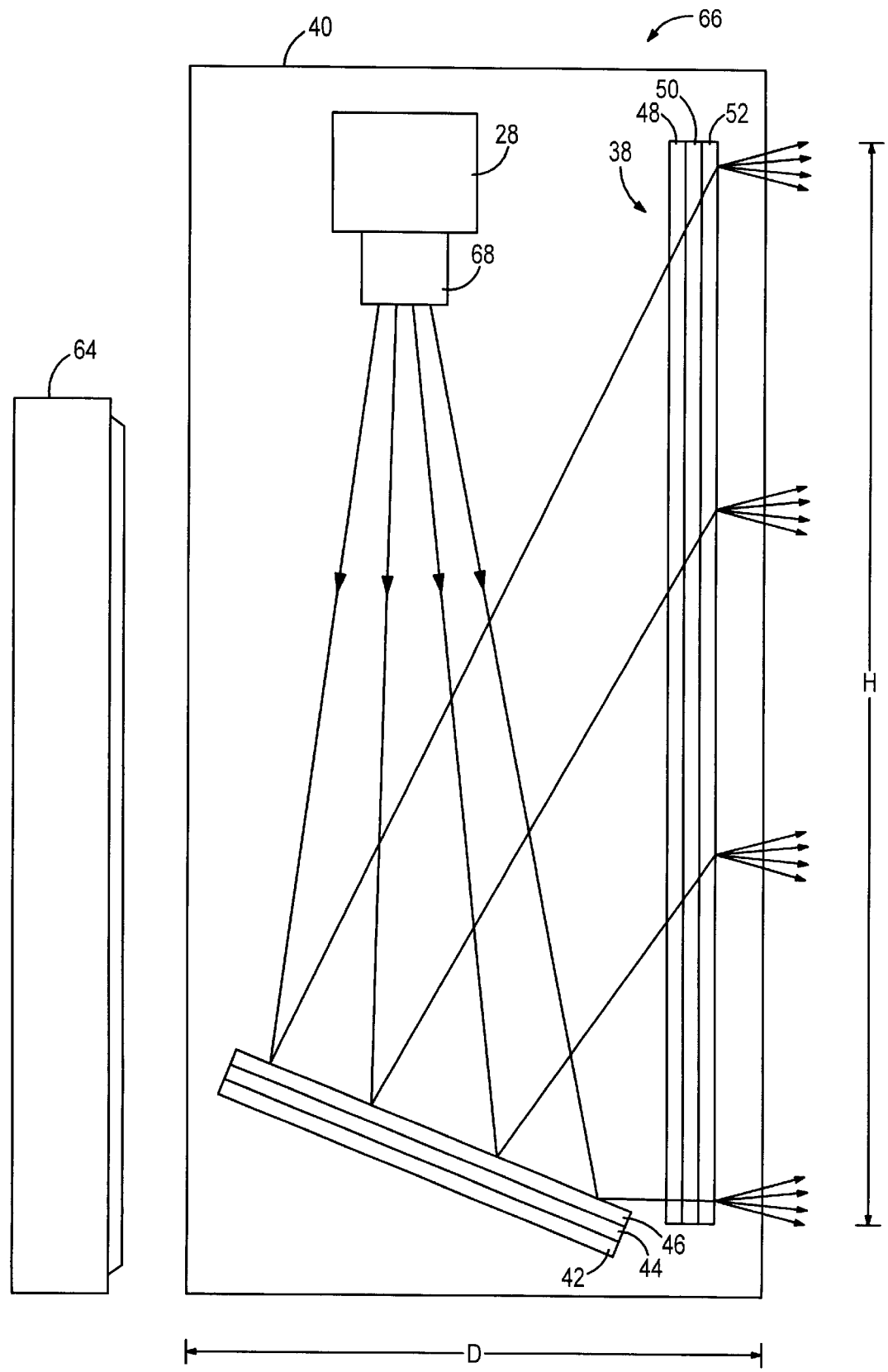
FIG. 4 is a schematic diagram of a compact projection monitor in accordance with a second embodiment of the invention.

Turning to FIG. 4, a projection monitor 66 in accordance with a second embodiment is shown. The same reference numerals of FIG. 2 will be used for the same components illustrated in FIG. 4. The monitor 66 includes the image generator 28, projection optics 68, the holographic reflector 36 and the viewing screen 38 that are collectively contained within the housing 40. The projection optics 68 essentially performs the functions of the optical devices 30 and 34 of the monitor 66. The projection optics provides the optical interface between the image generator and the holographic reflector. The projection optics may include a combination of off-axis aspheric, cylindrical and prismatic optical elements to correct for off-axis aberrations caused by the particular arrangement of the monitor's components. The projection optics may be designed to be anamorphic to compensate for the off-axis aberrations. The monitor may include the LC shutter (not shown) incorporated onto the back surface of the housing. The component arrangement of the monitor 66 preferably allows the depth D of the housing 40 to be equal to or less than half the height H of the viewing screen.

Similar to the monitor 26 of FIG. 2, the monitor 66 can operate in a see-through mode or a display mode. The see-through mode of the monitor 66 is identical to the see-through operation of the monitor 26 of FIG. 2. During the see-through mode, the reconfigurable HOEs 42–52 of the holographic reflector 36 and the viewing screen 38 are set to the passive state, so that the external display device 64 can be seen through the monitor. However, the display operation of the monitor 66 is slightly different than the operation of the monitor 26. The primary difference between the two monitors is that for the monitor 66, the image components projected from the image generator 28 are directly transmitted to the holographic reflector 36, instead of being first reflected by a reflective element, such as the mirror 32. Another difference between the two monitors is that the incident angles of the projected image components on the holographic reflector 36 and the viewing screen 38 of the monitor 66 may be different than the corresponding incident angles in the monitor 26. In an arrangement in which the incident angles differ, the optical characteristics of the reconfigurable HOEs 42–52 of the monitor 66 are holographically configured to compensate for these differences.

The display operation of the monitor 66 will be briefly described. Initially, the image generator 28 sequentially generates and projects three monochromatic image components that correspond to the tristimulus colors toward the holographic reflector 36 via the projection optics 68. The projection optics corrects the off-axis aberrations of the projected image components. In a cycle that is both temporally and chromatically synchronized with the sequenced projection of the three monochromatic image components, the reconfigurable HOEs 42–46 of the holographic reflector and the reconfigurable HOEs 48–52 of the viewing screen 38 are sequentially enabled to reflect, diffract and diffuse the image components to display a color image formed by the three monochromatic image components on the viewing screen.

Figure 5:
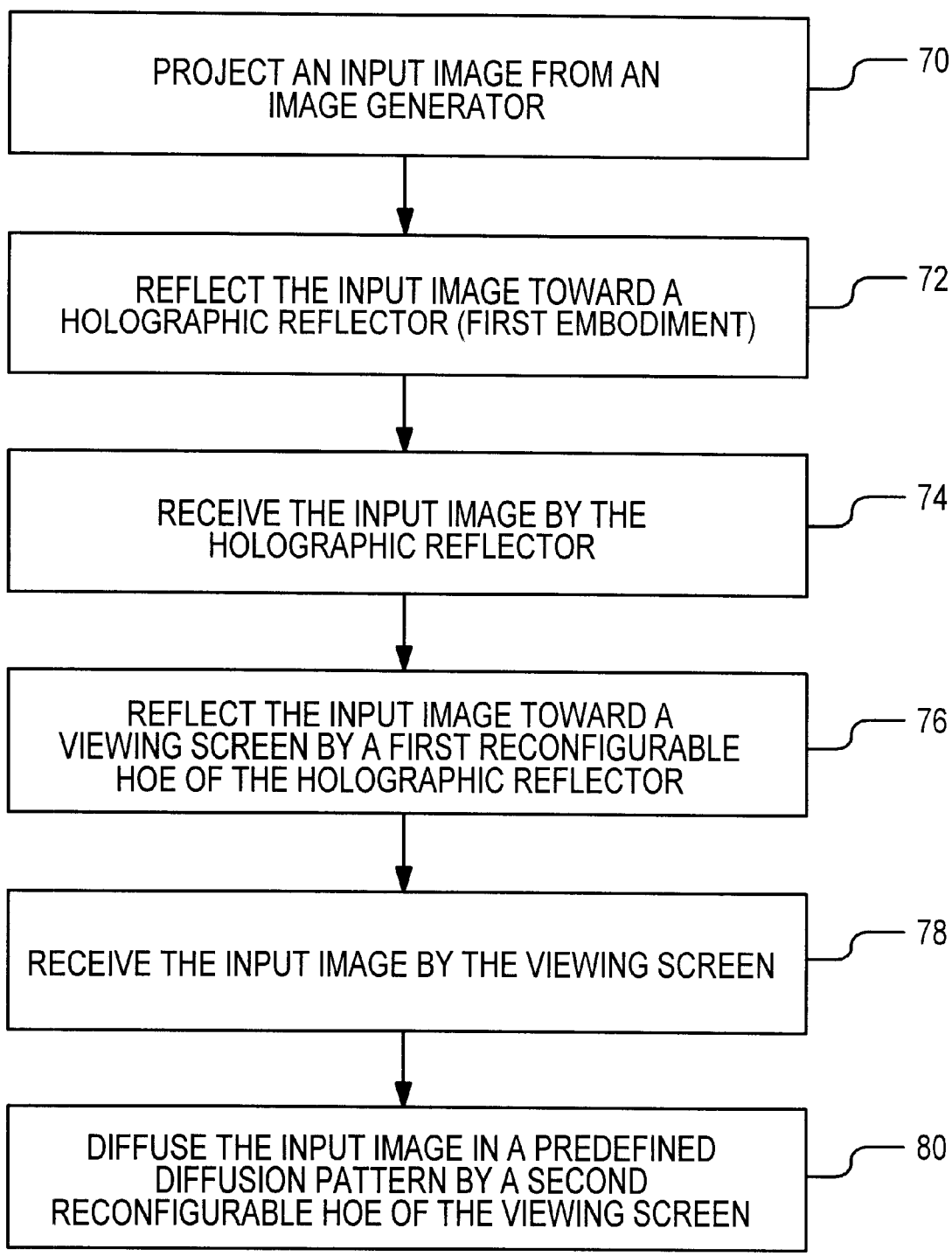
FIG. 5 is a flow diagram of a method of displaying an output image on a viewing screen in accordance with the invention.

A method of displaying an input image on a screen of a projection monitor in accordance with the present invention will be described with reference to FIG. 5. At step 70, the input image is generated and projected by an image generator of the projection monitor. In a first embodiment, the input image is then reflected toward a holographic reflector by a mirror, at step 72. However, in a second embodiment, the input image is directly transmitted to the holographic reflector. At step 74, the input image is received by the holographic reflector. The input image is then reflected and diffracted toward a viewing screen by a first reconfigurable HOE of the holographic reflector, at step 76. Next, at step 78, the input image is received by the viewing screen. At step 80, the input image is diffused in a predefined diffusion pattern by a second reconfigurable HOE of the viewing screen, so that the viewing screen displays a uniformly bright image, even at large viewing angles.

What is claimed is:

1. An imaging system comprising:
   image-generating means for projecting an input image; and
   redirecting means optically positioned to receive said input image propagating in a first direction for reflecting and diffracting said input image in a second direction, said redirecting means including a first reconfigurable holographic optical element having a controllable optical characteristic that is responsive to an applied electrical field, said reconfigurable holographic optical element being holographically configured to optically manipulate light of a particular tristimulus color when in a diffractive state.

2. The system of claim 1 wherein said first reconfigurable holographic optical element is one member of a set of three reconfigurable holographic optical elements, each of said three reconfigurable holographic optical elements being holographically configured to optically manipulate one of red, green and blue lights when in said diffractive state.

3. The system of claim 1 further comprising a voltage controller electrically coupled to said first reconfigurable holographic optical element of said redirecting means to selectively provide voltage to said first reconfigurable holographic optical element, said voltage provided by said voltage controller being sufficient to generate said applied electrical field.

4. The system of claim 1 further comprising a display means optically coupled to said redirecting means for displaying said input image from said redirecting means, said display means including a second reconfigurable holographic optical element having a diffusing characteristic that is responsive to a second applied electrical field.

5. The system of claim 4 further comprising a housing that includes said image-generating means, said redirecting means and said display means, said housing being substantially optically transparent in a viewing direction generally parallel to an axis that is normal to a viewing surface of said display means, such that said system is transparent in said viewing direction when said first and second reconfigurable holographic optical elements are in a passive state.

6. The system of claim 4 wherein said first reconfigurable holographic optical element of said redirecting means is positioned relative to said second reconfigurable holographic optical element of said display means such that an emanating surface of said first reconfigurable holographic optical element is nonparallel to an incident surface of said second reconfigurable holographic optical element.

7. The system of claim 1 further comprising a reflective means optically positioned between said image-generating means and said redirecting means for reflecting said input image from said image-generating means to said redirecting means.

8. The system of claim 1 wherein said first reconfigurable holographic optical element includes a hologram containing liquid crystal and photopolymeric material.

9. A method of manipulating images comprising steps of:
   projecting an input image from an image generator of an imaging system;
   receiving said input image projected from said image generator by an optical device of said system, said input image propagating in a first direction prior to being received by said optical device; and reflecting at least a portion of said input image that is composed of a particular tristimulus color in a second direction by a first reconfigurable holographic optical element of said optical device, including selectively diffracting said portion of said input image, said first reconfigurable holographic optical element having a controllable optical characteristic that is responsive to an applied electrical field.

10. The method of claim 9 further comprising a step of displaying said portion of said input image on a display screen, including diffusing said portion of said input image in a predefined diffusion pattern by a second holographic optical element included in said display screen, said second holographic optical element having a controllable diffusing characteristic that is responsive to a second applied electrical field.

11. The method of claim 9 further comprising a step of reflecting said input image from said image generator toward said optical device such that said input image is reflected from an initial direction to said first direction.

12. The method of claim 11 wherein said step of reflecting said input image from said image generator toward said optical device is a step of reflecting said input image from said image generator toward said optical device such that said input image is reflected from said initial direction to said first direction in which said first direction is generally perpendicular to said initial direction.

13. The method of claim 9 further comprising a step of correcting off-axis aberrations of said input image projected from said image generator by transmitting said input image through at least one optical element.

14. The method of claim 9 wherein said step of projecting said input image is a step of projecting a monochromatic input image from said image generator.

15. An imaging system comprising:

an image generator that projects input images in an initial direction;

a holographic reflector optically positioned to reflect said input images projected from said image generator toward a final direction, said holographic reflector including a first reconfigurable holographic optical element having an optical characteristic that is controllable by an applied electrical field, said first reconfigurable holographic optical element being holographically configured to optically manipulate light of a particular tristimulus color when in a diffractive state.

16. The system of claim 15 further comprising a viewing screen optically coupled to said holographic reflector, said viewing screen including a second reconfigurable holographic optical element having a diffusing characteristic that is responsive to a second applied electrical field.

17. The system of claim 16 wherein said holographic reflector is positioned relative to said viewing screen such that opposing surfaces of said holographic reflector and said viewing screen make an angle greater than zero degrees.

18. The system of claim 15 further comprising a reflective element positioned between said image generator and said holographic reflector, said reflective element having a reflective surface that is orientated to reflect said input images from said image generator to said holographic reflector.

19. The system of claim 15 wherein said first reconfigurable holographic optical element of said holographic reflector is one member of a set of three holographic optical elements included in said holographic reflector, each of said three holographic optical elements being holographically configured to optically manipulate one of red, green and blue lights when in said diffractive state.

* * * * *